United States Patent [19]
Takahashi

[11] Patent Number: 5,812,743
[45] Date of Patent: Sep. 22, 1998

[54] IMAGE RECORDING SYSTEM

[75] Inventor: Akihiko Takahashi, Kawasaki, Japan

[73] Assignee: Nikon Corporation, Tokyo, Japan

[21] Appl. No.: 735,394

[22] Filed: Oct. 21, 1996

[30] Foreign Application Priority Data

Oct. 23, 1995 [JP] Japan .................................. 7-274520

[51] Int. Cl.$^6$ ................................................ G06K 15/00
[52] U.S. Cl. .......................................... 395/110; 395/109
[58] Field of Search ................................ 395/101, 109, 395/102, 110; 358/470, 451, 456, 428; 382/298, 299, 300; 345/428, 432, 471, 472, 439

[56] References Cited

U.S. PATENT DOCUMENTS

| 4,851,825 | 7/1989 | Naima ..................................... 340/728 |
| 5,506,941 | 4/1996 | Kurumida ............................... 395/110 |

Primary Examiner—Arthur G. Evans
Attorney, Agent, or Firm—Oliff & Berridge, PLC

[57] ABSTRACT

An image recording system and method for smoothing printed characters, in particular, for low resolution printers. The image recording system includes a font decoding device, a font generating device and a font sizing device. The font decoding device decodes first font data including first character size information and first luminance (optical density) information. The first luminance information has two gradation levels for printing image data. The font generating device generates second font data including second character size information, which is larger than the first character size, based on the first font data. The font sizing device reduces the font of the second font data to the size of the first character and at the same time converts the first luminance (optical density) information using spatial filters into multiple gradations to reduce printed character jaggedness. Alteratively, the image recording system can use a pattern recognition spatial filter on the first font data to convert the first luminance information into multiple gradations to reduce printed character jaggedness.

33 Claims, 5 Drawing Sheets

IMAGE RECORDING SYSTEM

BACKGROUND OF THE INVENTION

1. Field of the Invention

An image recording system that smoothes printed characters, in particular, for a low resolution image recording apparatus.

2. Description of the Related Art

Figure 7A:
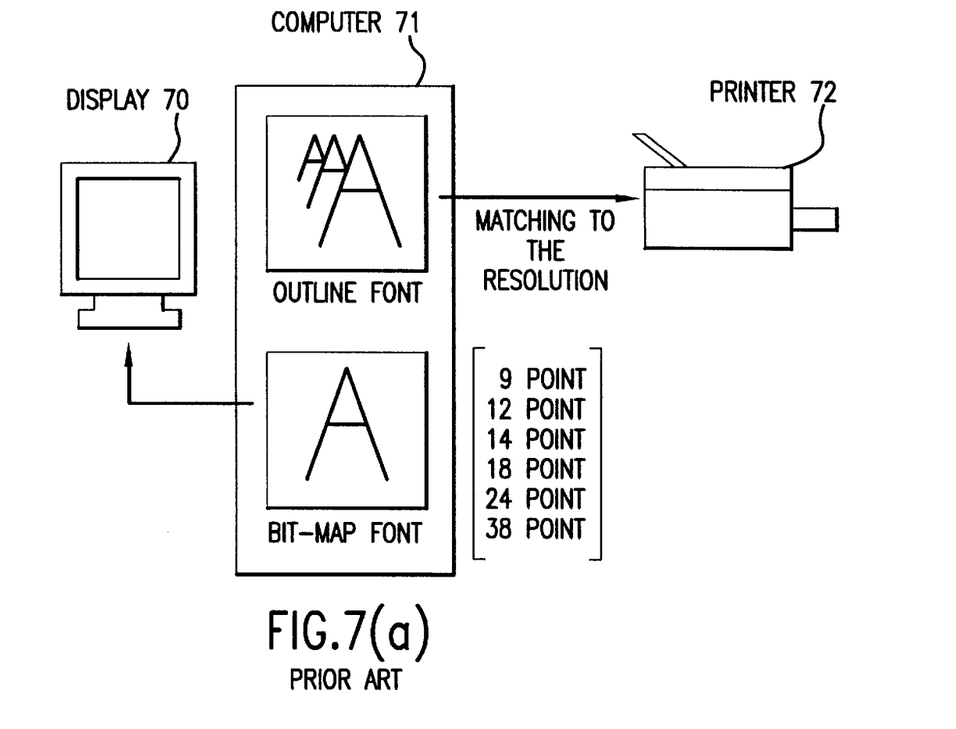
FIGS. 7(a) and 7(b) are diagrams showing conventional image recording devices.
Figure 7B:
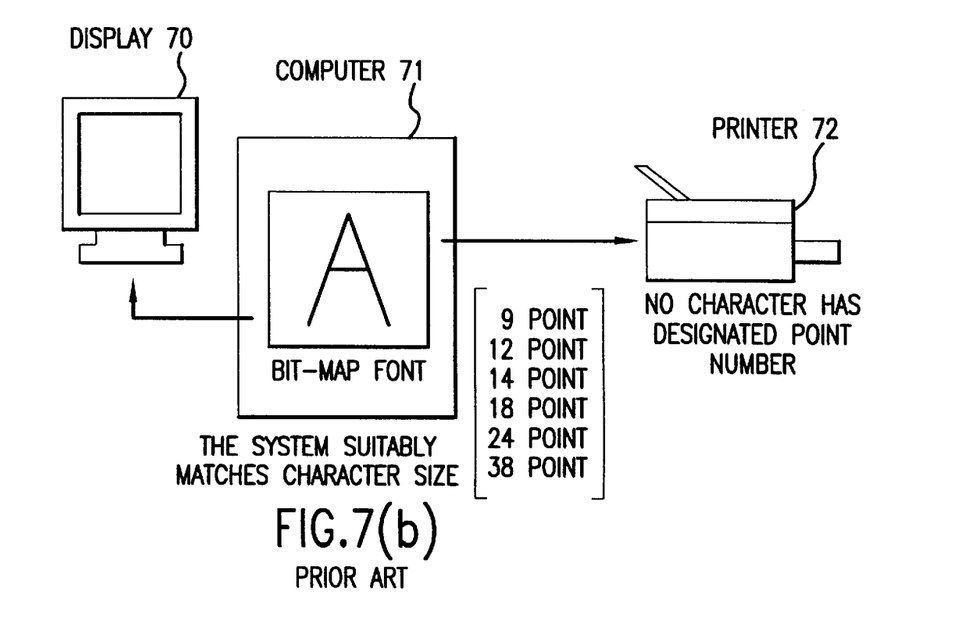

As shown in FIGS. 7(a)–(b), a printer 72 and a display 70 are connected to a computer 71. Conventionally, when printing characters, the printer 72 relies on functions performed by the computer 71. Such a configuration is shown in FIG. 7(a). The computer 71 generally uses two types of fonts, bit-map fonts and outline (i.e., vector) fonts, internally. To print the bit-map fonts, the computer 71 outputs the bit-map font data to the printer 72. However, to print the outline fonts, the computer 71 converts an outline font to a corresponding bit-map font that matches the resolution level of the printer 72. When the printer 72 has a sufficiently high resolution, the printed characters are smooth. In other words, jaggedness in the printed characters is not noticeable.

In the low resolution printer 72, a jaggedness is noticeable when the printed character information is converted from the outline font to the corresponding bit-map font and is printed. The character jaggedness is caused by the low resolution level of the printer 72.

For some font types only a bit-map font is stored in the computer 71. Such a configuration is shown in FIG. 7(b). Further, only limited points (sizes) for a font type are stored in the computer 71. As shown in FIG. 7(b), only the 9, 12, 14, 18, 24 and 38 points of a bit-map font are stored in the computer 71. If some point of a font type is used that is not previously stored, the image recording system shown in FIG. 7(b) matches the size of the characters with the most suitable (approximate) size available from the stored font points. In this case, even if a high resolution printer is used, jaggedness is noticeable in the printed characters.

However, some low resolution printers are capable of controlling gradation on each pixel and are therefore suitably used for recording image data. Conventionally, when using a font whose points are not previously stored in this type of printer, the printed character jaggedness cannot be prevented because of the low resolution characteristic of the printer. Conventionally, this situation has been treated as an unsolved problem.

SUMMARY OF THE INVENTION

It is an object of the present invention to provide an image recording system and method that solves the at least the above problems and suppresses the occurrence of character jaggedness of conventional image recording systems.

It is another object of the present invention to provide an image recording system and method where the occurrence of character jaggedness is effectively suppressed in a low resolution image recording system using gradation controlled printing (recording) on each pixel.

It is yet another object of the present invention to provide an image recording system and method using spatial filters to convert two luminance level printing information to multiple luminance level printing information to reduce printing image jaggedness.

In order to achieve the above and other objects and to address shortcomings in the prior art, an image recording system and method according to embodiments of the present invention include a font decoding device, a font generating device and a font sizing device. The font decoding device decodes first font data including first character size information and first luminance (optical density) information. The first luminance information has two gradation levels for printing image data. The font generating device generates second font data including second character size information, which is larger than the first character size. The font sizing device reduces the font of the second font data to the size of the first character and at the same time converts the first luminance (optical density) information into multiple gradations.

Other objects, advantages and salient features of the invention will become apparent from the detailed description taken in conjunction with the annexed drawings, which illustrate preferred embodiments of the invention.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

An image recording system according to embodiments of the present invention includes a computer 21 and a printer 22. According to a first embodiment of the present invention shown in FIG. 1(a), printer driver functions are performed by a font decoding member 31, a font generating member 32 and a font reducing member 33, which are located in the computer 21. Preferably, the printer driver functions are incorporated as application software that is permanently stored in a memory 34. A central processing unit (CPU) 30 accesses and processes the printer driver software when necessary. To simplify the explanation of the present invention, in the first embodiment the CPU 30 controls the printer driver functions (software). That is, the font decoding member 31, the font generating member 32 and the font reducing member 33 are within the CPU 30 in the computer 21.

Figure 1A:
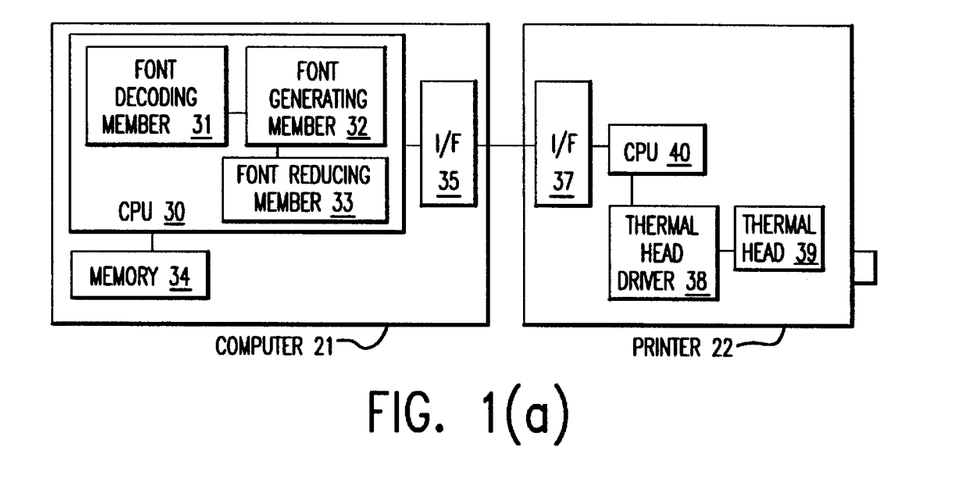
FIGS. 1(a)–(b) are block diagrams showing components of an image recording system according to embodiments of the present invention.

The font decoding member 31 decodes various parameters of font data. Font data can include data such as point number, kind of font, font type, style, luminance (optical density), color and the like. The font type includes the type of font, such as bit-map font, outline font, True Type font and the like. The luminance (optical density) data shows the luminance of each component color such as red (R), green (G), and blue (B). Alternatively, the luminance data can be used for different component colors such as yellow (Y), magenta (M) and cyan (C). For example, when the luminance data is represented by 8-bit data, a minimum luminance value (maximum optical density value) can be indicated by zero (0). The minimum luminance value is the data that indicates the darkest tone. The maximum luminance value (minimum optical density value) is then indicated as 255. The maximum luminance value is the data that indicates the brightest tone. When each component color R, G and B all have the minimum luminance value, the resultant color is black. Alternatively, when each of Y, M and C, all have the maximum optical density value, the resultant color is black. When each color R, G and B, all have the maximum luminance value (Y, M and C have the minimum optical density value), the resultant color is white.

Figure 3:
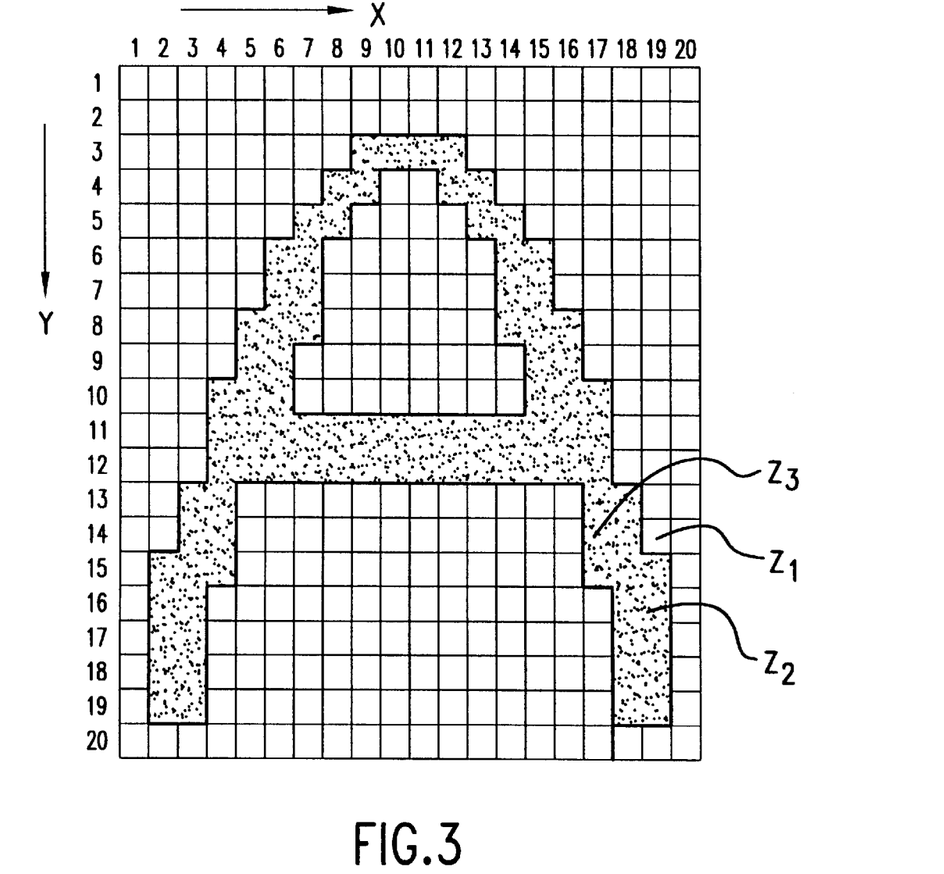
FIG. 3 is a diagram showing a doubled font point number printed character.

Generally, the luminance of font data contains two gradation levels, the colors white and black. For example, as shown in FIG. 3, the luminance value of coordinates (X1, Y1) is the maximum value 255. Moreover, the luminance value of coordinates (X9, Y3) is the minimum luminance value 0.

The font generating member 32 determines increased, for example, double-sized points for a given font received from the font decoding member 31. The font generating member 32 can be a circuit that generates a font with simulated double-sized points. Alternatively, the font generating member 32 can select, if available for that font, double-sized points from the list of prestored font points. Upon completing the generation of the double-sized point for the font, the double-sized point font can be output, for example, to the font reducing member 33.

The font reducing member 33 determines reduced size points for a character of a given font while concurrently producing a multiple gradation representation of the character. The font size reducing member 33 shown in FIG. 1(a) is a circuit that receives and reduces the double-sized font created by the font generating member 32. The font decoding member 31, the font generating member 32 and the font size reducing member 33 are preferably operated after font data is input and temporarily stored in the memory 34 of the image recording system. The font data from the font reducing member 33 is input to the printer 22 through an interface (I/F) 35 in the computer 21 and an I/F 37 in the printer 22.

Figure 1B:
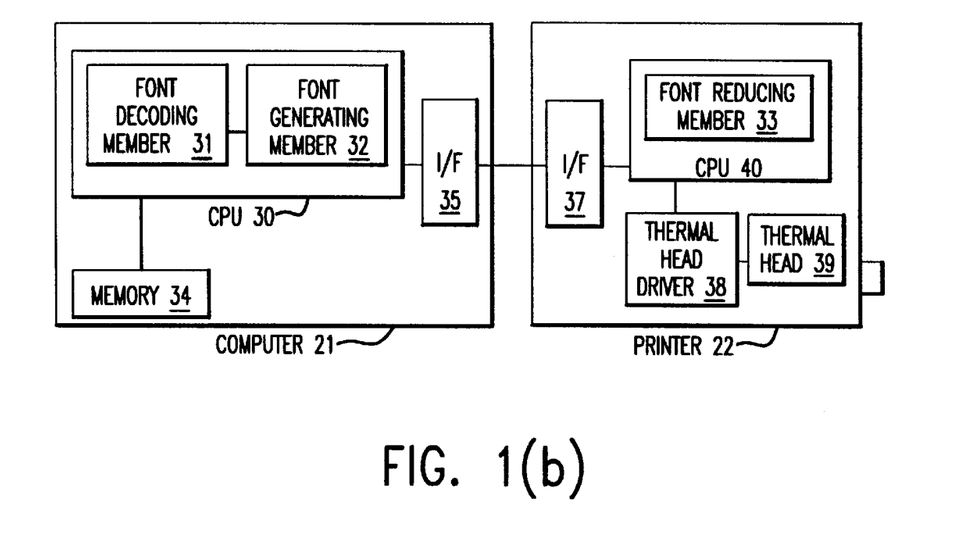

One of ordinary skill in the art would know that the same effect can be obtained by other configurations of the font decoding member 31, the font generating member 32 and the font reducing member 33. As shown in a second configuration in FIG. 1(b), the font size reducing member 33 is located in the CPU 40 in the printer 22. The font decoding member 31 and the font generating member 32 remain in the CPU 30 in the computer 21 as shown in FIG. 1(b). As another exemplary example, the font decoding member 31, the font generating member 32 and the font reducing member 33 can be relatively placed in the CPU 40 in the printer 22. Thus, the invention is not limited to the configuration of the printer driver functions shown in FIGS. 1(a)–1(b).

Within the printer 22, a CPU 40 transfers the font data to be printed to a thermal head driver 38 line-by-line. The thermal head driver 38 drives a thermal head 39 based on the transferred font data. Using this process, multiple gradation printing (recording) by the thermal head 39 can be executed.

Using the first embodiment shown in FIG. 1(a), the printer driver functions are implemented using the CPU 30 in the computer 21. Therefore, the printing processes in the printer 22 are unchanged. Thus, the first embodiment efficiently and cheaply eliminates the necessity of modifying an existing printer of an image recording apparatus.

A method that suppresses character jaggedness in embodiments of the present invention will be described with reference to FIG. 2. The method can be implemented, for example in the CPU 30, or under the control of the CPU 30.

A printing font is first selected in accordance with the operator's specifications. Font selection or specification of the kind of font is commonly executed in an application program, previously installed and executing in the computer 30. For example, in a word processing application Japanese kinds of fonts, such as "OSAKA", "GOTHIC" or "MINCHYOU" and English alphabet kinds of fonts, such as "Arial" or "Century" are selected.

Figure 2:
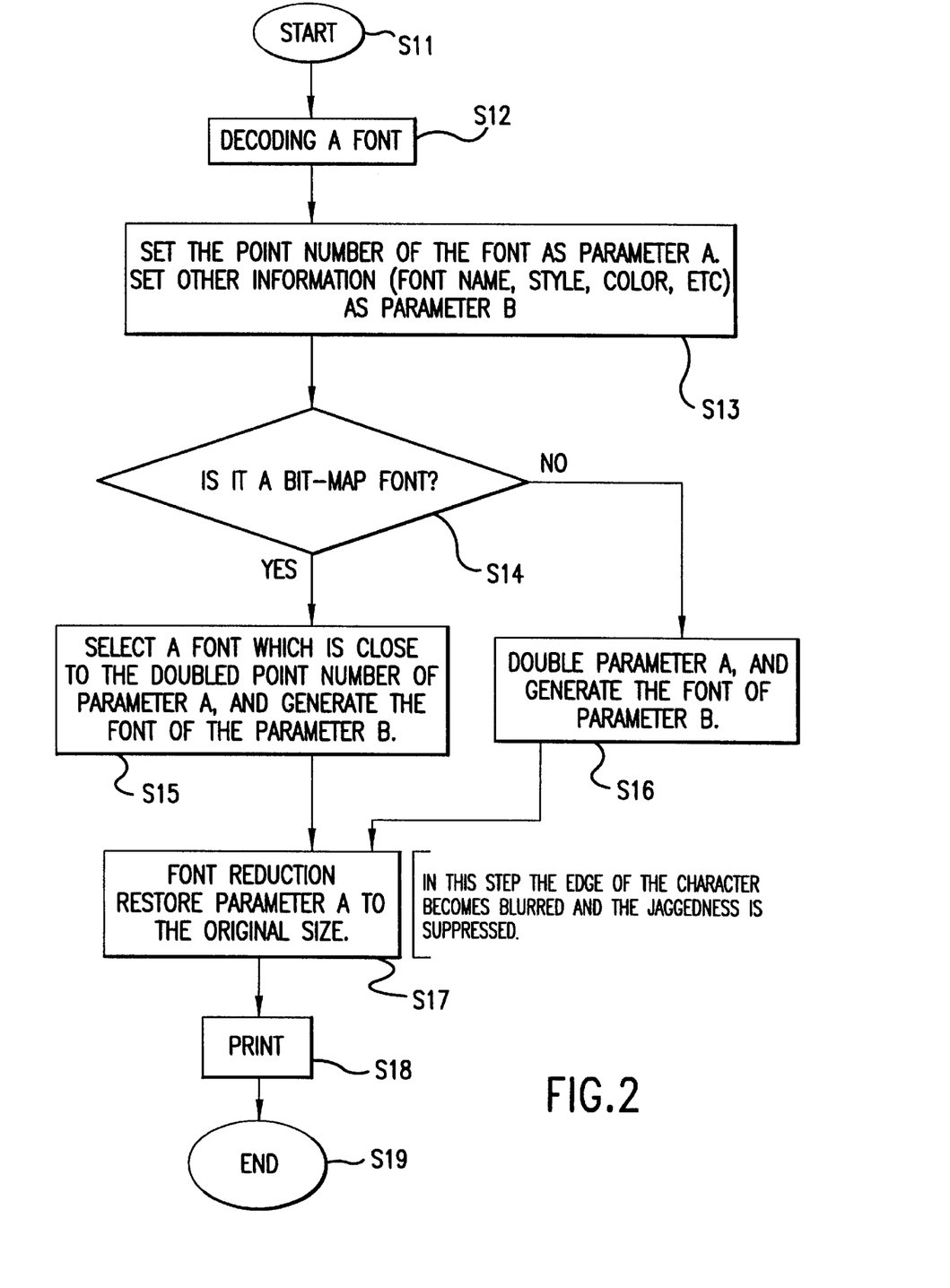
FIG. 2 is a flowchart showing operations of the image recording system of FIG. 1(a)

The flowchart in FIG. 2 starts when the operator uses an operation member (not shown) to generate a printing instruction received by the CPU 30.

After beginning in step S11, a control program continues to step S12. In step S12, the font decoding member 31 decodes font data received from the operation system (OS) of the computer 21. That is, the font decoding member 31 decodes each font data including a point number, a kind of font, a font type, a font style and luminance (optical density) data. From step S12, the control program continues to step S13.

In step S13, the font decoding member 31 divides the contents of the font data into two parameters. For example, the point number is selected from the font data as parameter A. As an example, assume that the decoded point number is determined to be "10". Next, the remaining font data (excepting the point number) such as the kind of font ("OSAKA"), the style ("Bold") and the luminance ("0"), is selected to be parameter B. Thus, the font decoding member 31 has divided the received font data into two parameters. From step S13, the control program continues to step S14.

In step S14, the font decoding member 31 judges whether the font type in the parameter B of the font data is a bit-map font. In other words, the judgment is based on the font type from the font data decoded in step S12. If the font type is determined to be a bit-map font in step S14, the control program continues to step S15.

In step S15, the font generating member 32 selects a point number from a list of available point numbers for the selected bit map font from the OS. The font generating member 32 selects the point number that is approximately twice the size of the point number decoded in step S12. One list of available point numbers for a bit-map type font was discussed above with reference to FIGS. 7(a)–7(b). In the above example, the point number "10" was decoded in step S12. Continuing that example, the font generating member 32 selects a point number from the bit-map font that is approximately twice the size of "10".

For an image recording system having font point numbers of 9, 12, 14, 18, 24 and 38 for the selected bit-map font, the font generating member 32 selects the point number of "18" to generate the font data. Preferably, the font generating member 32 receives the parameter B of the font data from the OS for the point number "18."

If the font type is determined to be other than a bit-map font in step S14 (e.g., a True Type font) the control program jumps to step S16. In step S16, the font generating member 32 doubles the point number decoded in step S12. In the above example, the point number "10" was decoded in step S12. Continuing that example, the font generating member 32 uses a calculation formula to set the parameter A to "20," which is twice the size of the original point number. Then, the font generating member 32 generates the parameter B font data for the doubled point number "20". Preferably, the font generating member 32 receives the parameter B font data for the doubled point number "20" from the OS.

For example, the font "OSAKA" is an initial True Type font. Therefore, from step S14 the control program jumps to step S16. In step S16, the parameter A is doubled (i.e., point number "10"×2) and the font data of the parameter B is generated. In the parameter B, for example, the font style (designated Bold) and the character data (previously developed in bit-map) can be received from the OS.

In the method shown in FIG. 2, an approximately doubled point number is generated in step S15 and an exactly doubled point number is generated in step S16. However, this example is not intended to be limiting. The point number can be tripled or multiplied by a factor of 2.5, for example. Further, the reason the point number is not exactly doubled in step S15 is that doubled point number cannot always be obtained. When using bit-map fonts, the point number must be selected from the possibly limited set of previously stored point numbers available for the selected bit-map font.

From both step S15 and step S16, the control program continues to step S17. In step S17, the font reducing member 33 restores (reduces) the size of the character to be printed to the parameter A. In the above example, the exactly doubled point number "20" of step S16 and the approximately doubled point number "18" of step S15 are restored to the point number "10", respectively. More specifically, the font reducing member 33 reduces the point number of the font and at the same time converts the luminance (optical density) value from two-level gradation (e.g., white, black) to multiple gradation. Thus, in embodiments according to the present invention, printed character jaggedness can be reduced even in fonts such as bit-map fonts, whose point numbers are registered at limited intervals.

As increased (doubled) point numbers for characters become larger in steps S15 and S16, the processing time to reduce the font in step S17 or by the font reducing member 33 also increases. On the other hand, as the doubled point number that generates a printed character becomes larger, the resulting printed character jaggedness is suppressed more effectively. Thus, a suitable multiplier can be selected to balance the competing interests of low processing time (fast printing) and the desired level of character point number amplification (character smoothing) for a particular printing application.

From step S17, the control program continues to step S18 where printing of the smoothed (reduced and converted) font data is completed. From step S18, the control program continues to step S19, where the operation ends.

Next, the font size reducing member and the font size reducing step S17 will be explained in further detail. One exemplary method to reduce the font size from the increased size two-level gradation font generated by steps S15 and S16 to the original size font in the parameter A of the font data is described with reference to FIG. 3. A character "A" is formed being 20 pixels (X direction) by 20 pixels (Y direction) as shown in FIG. 3. When the font size is doubled (steps S15 or S16), the luminance (optical density) information in the font data remains in the two-level gradation format. As shown in FIG. 3, the luminance information of the black pixels in the character portion of the character "A" are represented by "0" and of the white pixels in the non-character portion are represented by "255"using the two-level gradation data. In other words, when the printer 22 processes an 8-bit gradation, the luminance (optical density) information is either black (colored) "0" or white (background) "255".

Figure 4:
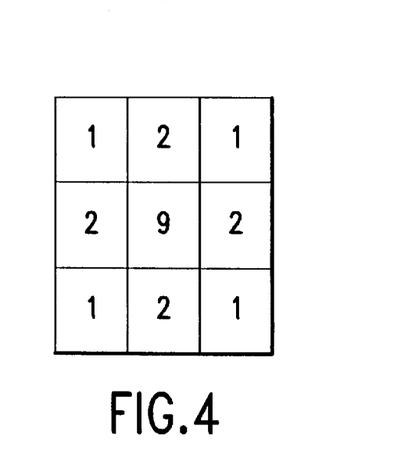
FIG. 4 is a diagram showing a weighting spatial filter.

An exemplary spatial filter for weighting is shown in FIG. 4. The values (numbers) in the 3×3 weighting spatial filter in FIG. 4 are weight coefficients. The character "A" in FIG. 3 can be converted from two-level gradation data to multiple level gradation data by applying the 3×3 weighting spatial filter to the character "A". Of course, one of ordinary skill in the art would know that the invention is applicable to weighting spatial filters having dimensions other than 3×3. For example, a 2×2 spatial filter could be used. Also, the invention is applicable to weight coefficients (proportions) in the spatial filter other than those in the weighting spatial filter shown in FIG. 4. Thus, the invention is not limited to image recording systems or methods that smooth printed characters using 3×3 weighting spatial filters having the weight coefficients shown in FIG. 4.

The weighting spatial filter shown in FIG. 4 can be applied to the character "A" in FIG. 3, by skipping every other pixel. In the X direction, for example, when the spatial filter is applied to (X2, Y2), one pixel (X1) is skipped in the X direction. Next, (X3, Y2) is skipped and the spatial filter is applied to (X4, Y2). The increased size character "A" shown in FIG. 3 consists of 20 pixels in the X direction. Because the weighting spatial filter of FIG. 4 is applied to every other pixel, the pixel gradation calculation is performed only 10 times. That is, applying the spatial filter requires 10 calculations corresponding to 10 pixels in the X direction. Therefore, the character size is reduced by ½ in the X direction.

Applying the spatial filter to every other pixel in the Y direction in step S17, can similarly reduce the character size by ½ in the Y direction.

The point number of a font is doubled in steps S15 and S16. Through the application of the spatial filter in step S17, the doubled character is returned to the original point number (size) and converted to a multiple level gradation. For example, by applying the weighted spatial filter to every other pixel in both the X and Y directions, the size of the font can be reduced by half, for example. Further, calculations in step S17 are simplified because the same calculation using the weighting spatial filter is repeatedly executed at every other pixel.

For example, a pixel gradation determination using the weighting spatial filter shown in FIG. 4 and pixels in the character "A" shown in FIG. 3 yields the following result. Placing the FIG. 4 weighting spatial filter on pixel Z1 (X19, Y14) obtains a pixel gradation value of 182. The gradation value for the pixel Z1 is determined as follows: 0(X18, Y13)×1/21+255(X19, Y13)×2/21+255(X20, Y13)×1/21+0 (X18, Y14)×2/21+255(X19, Y14)×9/21+255(X20, Y14)×2/ 21+0(X18, Y15)×1/21+0(X19, Y15)×2/21+255(X20, Y15) ×1/21=182. Thus, the portion of the character "A" that corresponds to the pixel Z1 has an (intermediate) gradation value of 182. A portion of the character "A" in FIG. 3 that corresponds to a pixel Z2 (X19, Y16) has an intermediate gradation of 49 using the same pixel gradation value calculation. The pixel Z2 is contiguous to the pixel Z1 after the size reduction and gradation determination process described above. After being processed by the font reducing member 33 in step S17, an intermediate pixel Z3 is also contiguous to pixel Z1 with an intermediate gradation of 49 using the same pixel gradation value calculation.

Thus, when a character is being printed in the original font point number (size) after being reduced and converted by the font reducing member 33, the character is printed using multiple gradation. The multiple gradation printing suppresses the jaggedness of the character.

A second exemplary method to reduce and convert the increased size two-level gradation font to the original point number with multiple gradation will now be provided. An example of spatial filters using pattern recognition is shown in FIGS. 6(a)–6(e). The font reducing member 33 can include the patterns shown in FIG. 6. For each of the patterns, the font reducing member 33 includes a plurality of luminance (optical density) information for the center pixel of each pattern. The plurality of luminance (optical density) information includes at least a predetermined gradation value for the center pixel.

For example, the center pixels, corresponding to the patterns shown in FIGS. 6(a)–6(e), can have the following determined gradation values.

Figure 6A:
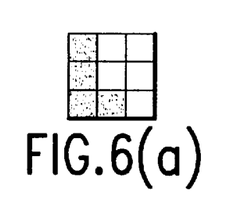
FIGS. 6(a)–6(e) are diagrams showing pattern recognition spatial filters.

In the pattern illustrated in FIG. 6(a), the luminance is gradation converted from 100% to 70% (optical density, from 0% to 30%). In other words, the luminance information is determined to be 255×0.7=179.

Figure 6B:
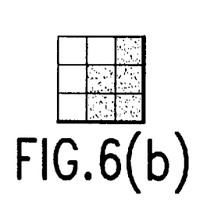

In the pattern shown in FIG. 6(b), the luminance is gradation converted from 0% to 70% (optical density, from 100% to 30%). That is, the luminance information is determined to be 255×0.7=179.

Figure 6C:
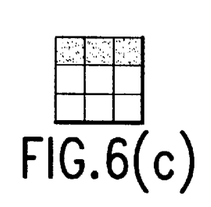

In the pattern shown in FIG. 6(c), the luminance is gradation converted from 100% to 100% (optical density, from 0% to 0%). That is, the luminance information is determined to be 255×1.0=255.

Figure 6D:
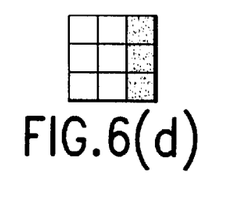

In the pattern shown in FIG. 6(d), the luminance is gradation converted from 100% to 95% (optical density, from 0% to 5%). That is, the luminance information is determined to be 255×0.95=242.

Figure 6E:
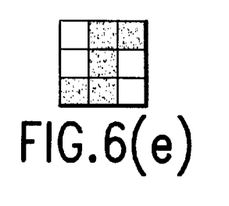

In the pattern shown in FIG. 6(e), the luminance is gradation converted from 0% to 0% (optical density, from 100% to 100%). That is, the luminance information is determined to be 255×0=0.

Figure 5:
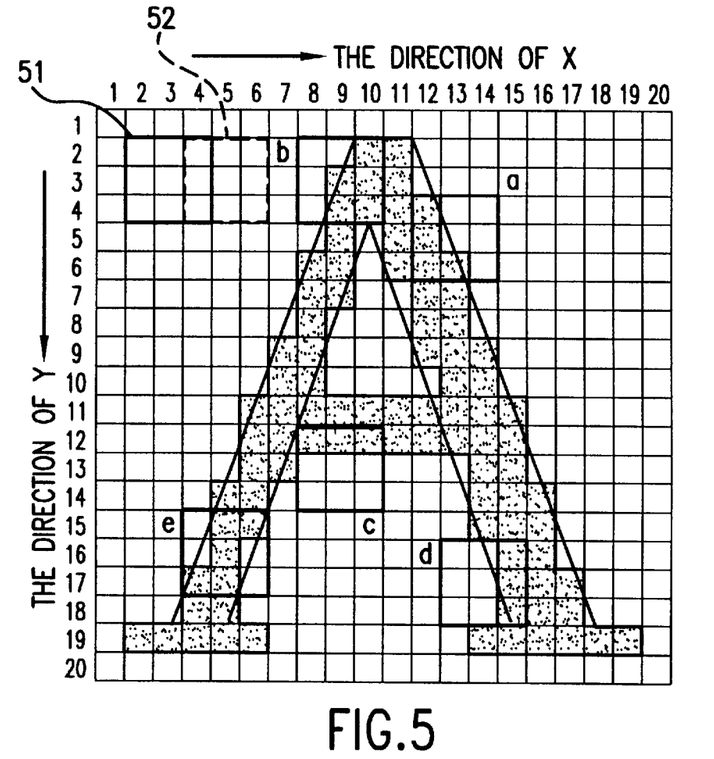
FIG. 5 is a diagram showing another doubled font point number printed character.

In particular, the character in FIG. 5 having an increased size two-level gradation font (steps S15 or S16) can be reduced to the original font point number and converted to multiple gradation by the font reducing member 33 using pattern recognition. First, one row/column of pixels in both the X and Y directions is skipped. The first line (row/column) in both the X and Y directions is skipped because a character rarely has font data appearing at the outside edge. Ignoring the outside row/column, and applying the spatial filter on only the inside of the character "A" shown in FIG. 5 improves efficiency and beneficially results in the process being completed in a reduced period of time.

A pattern recognition spatial filter is then applied on the 9pixels in a region 51 (X2–4, Y2–4) shown in FIG. 5. Next, one pixel in the X direction is skipped, and the pattern recognition spatial filter is applied on the 9 pixels in a region 52 (X4–6, Y2–4) shown in FIG. 5. By skipping alternate pixels in the X direction when applying the spatial filter, a character with 20 pixels (points) can be converted into 10 pixels in the X direction. In the same manner, by skipping alternate pixels in the Y direction when applying the spatial filter, a character with 20 pixels (points) can be converted into 10 pixels in the Y direction. The spatial filter is successively applied in the same manner to convert a 20 point number character into 10 point number character. Thus, the entire font data of the character "A" as shown in FIG. 5 is processed by the font reducing member 33.

Further, the regions a–e in FIG. 5 illustrate portions of the doubled font point number character "A" corresponding to the patterns of FIGS. 6(a)–(e).

Some weighting spatial filters, such as the one shown in FIG. 4, when applied to the pixel patterns shown in both FIGS. 6(b) and FIG. 6(e) would output exactly the same gradation value. However, in step S17 the font reducing member 33 using a pattern recognition spatial filter can distinguish the differences between the pixel patterns illustrated in FIGS. 6(b) and FIG. 6(e). Thus, a more precise gradation conversion process corresponding closer to an actual printed character can be realized using the pattern recognition filters relative to the weighting spatial filter.

Moreover, the point number is increased (doubled) in step S15 or step S16 in the method of FIG. 2. Then, the font size reducing step is performed (step S17).

Alternatively, the font reducing member 33 using the pattern recognition spatial filters in step S17, can omit the point number doubling process (i.e., omit step S15 and step S16). The font reducing member 33 would then apply the pattern recognition spatial filter on every pixel of the parameter A (original) point number sized character. That is, instead of applying the pattern recognition filter on every other pixel of the doubled point number font character, the pattern recognition filter is applied on each pixel so that the gradation conversion process does not reduce the point number. The gradation conversion process still suppresses the resulting printed character jaggedness.

The above embodiments were described using a weighting spatial filter and a pattern recognition spatial filter. However, the invention is applicable to spatial filters other than the two types mentioned above. All kinds of multiple value pixel image reduction methods and filters can be used for the font reducing member 33 or in the font size reducing step S17. For example, such reduction (enlargement) methods such as bi-linear methods or bi-cubic methods can be used. Thus, the invention is not limited to an image recording system or method that smoothes printed characters using weighting and pattern recognition spatial filters.

Also, the above embodiments do not consider the background image data around the character "A" in row X1 and column Y1, for example. However, the spatial filters can be applied to the surrounding region to suppress the occurrence of false gradations appearing at the border between the character data and the background image data.

In the embodiments according to the present invention, character jaggedness suppression in an image recording apparatus, which has previously been considered impossible, can be achieved. Further, the character jaggedness can be suppressed even in a low resolution image recording system.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An image recording system performing gradation controlled printing on each pixel in an image, the image recording system comprising:
    font decoding means for decoding first font data including first luminance information that has two gradation levels for printing the image, the first font data including bit-map font data and vector font data; and
    font gradation conversion means for converting the two level luminance information of the decoded bit-map font data and decoded vector font data to at least three levels of luminance information to reduce jaggedness in the image.

2. The image recording system of claim 1, wherein the first font data comprises a plurality of pixels, wherein the font gradation conversion means performs gradation conversion by using a spatial filter on the plurality of pixels, wherein the spatial filter is a pattern conversion spatial filter that performs the gradation conversion based on image patterns of the plurality of pixels.

3. The image recording system of claim 1, wherein the font decoding means further decodes a first character size of the first font data, the image recording system further comprising font generating means for generating second font data based on the first font data, the second font data having a second character size larger than the first character size, wherein the font gradation conversion means further reduces the second font data to the first character size.

4. The image recording system of claim 3, wherein the second font data comprises a plurality of pixels, wherein the font gradation conversion means performs gradation conversion by using a spatial filter on the plurality of pixels.

5. The image recording system of claim 4, wherein the spatial filter is a weighting spatial filter that performs gradation conversion using predetermined weighting coefficients.

6. The image recording system of claim 4, wherein the spatial filter is a pattern conversion spatial filter that performs the gradation conversion based on image patterns of the plurality of pixels.

7. The image recording system of claim 4, wherein the font gradation conversion means reduces the second font data to the first character size by skipping a predetermined number of pixels between applications of the spatial filter to the plurality of pixels.

8. The image recording system of claim 3, wherein the first character size and the second character size are selected from a set of predetermined character sizes.

9. The image recording system of claim 3, wherein the second character size is a multiple of the first character size.

10. The image recording system of claim 3, wherein the gradation conversion means reduces the second font data to the first character size at the same time the two gradation levels of the first luminance information are converted into at least three gradation levels.

11. The image recording system of claim 3, wherein the first font data and the second font data further include a font style, a font type and a kind of font.

12. The image recording system of claim 1, wherein the first luminance information includes red, green and blue component colors.

13. A method of performing gradation controlled printing in an image recording system, the method comprising the steps of:
 inputting an image having a plurality of pixels;
 decoding first font data of the image including first luminance information having two gradation levels for the plurality of pixels, the first font data including bit-map font data and vector font data;
 gradation converting the two level luminance information of the decoded bit-map font data and decoded vector font data to at least three levels of luminance information to reduce jaggedness in the input image; and
 printing the gradation converted font data having the at least three levels of luminance information for the input image.

14. The method of claim 13, wherein the gradation converting step comprises applying a spatial filter to the plurality of pixels, wherein the spatial filter is a pattern conversion spatial filter that performs the gradation conversion based on image patterns of the plurality of pixels.

15. The method of claim 13, wherein the decoding step further decodes a first character size of the first font data, the method further comprising the step of generating second font data based on the first font data, the second font data including at least a second character size larger than the first character size, wherein the gradation converting step further reduces the second font data to the first character size.

16. The method of claim 15, wherein the gradation converting step comprises applying a spatial filter to the plurality of pixels.

17. The method of claim 16, wherein the spatial filter is a weighting spatial filter that performs gradation conversion using predetermined weighting coefficients.

18. The method of claim 16, wherein the spatial filter is a pattern conversion spatial filter that performs the gradation conversion based on image patterns of the plurality of pixels.

19. The method of claim 16, wherein the gradation converting step reduces the second font data to the first character size by skipping a predetermined number of pixels between applications of the spatial filter to the plurality of pixels.

20. The method of claim 15, wherein the first character size and the second character size are selected from a set of predetermined character sizes.

21. The method of claim 13, wherein the first luminance information includes red, green and blue component colors.

22. An image recording system performing gradation controlled printing on an image having a plurality of pixels, the image recording system comprising:
 a decoder circuit that decodes first font data including first luminance information having two gradation levels for printing the image, the first font data including bit-map font data and vector font data; and
 a luminance converter circuit that converts the two level luminance information of the decoded bit-map font data and decoded vector font data to at least three levels of luminance information to reduce jaggedness in the image.

23. The image recording system of claim 22, wherein the luminance converter circuit performs gradation conversion by using a spatial filter on the plurality of pixels, wherein the spatial filter is a pattern conversion spatial filter that converts the luminance information based on image patterns of the plurality of pixels.

24. The image recording system of claim 22, wherein the decoder circuit further decodes a first character size of the first font data, the image recording system further comprising a font generating circuit that generates second font data based on the first font data, the second font data including at least a second character size larger than the first character size, wherein the luminance converter circuit further reduces the second font data to the first character size.

25. The image recording system of claim 24, wherein the second font data comprises a plurality of pixels, and the luminance converter circuit converts and reduces the luminance information by using a spatial filter on the second font data plurality of pixels.

26. The image recording system of claim 25, wherein the spatial filter is a weighting spatial filter that converts the luminance information using predetermined weighting coefficients.

27. The image recording system of claim 25, wherein the spatial filter is a pattern conversion spatial filter that converts the luminance information based on image patterns of the second font data plurality of pixels.

28. The image recording system of claim 25, wherein the luminance converter circuit reduces the second font data to the first character size by skipping a predetermined number of pixels between applications of the spatial filter to the second font data plurality of pixels.

29. The image recording system of claim 22, wherein the first character size and the second character size are selected from a set of predetermined character sizes.

30. The image recording system of claim 22, wherein the first luminance information includes red, green and blue component colors.

31. The image recording system of claim 1, wherein the font decoding means includes determining means for determining whether the first font data is bit map font data or vector font data.

32. The method of claim 13, wherein the step of decoding includes determining whether the first font data is bit map font data or vector font data.

33. The image recording system of claim 22, wherein the decoder circuit includes a determining circuit that determines whether the first font data is bit map font data or vector font data.

* * * * *